March 4, 1969   J. A. POPE ET AL   3,430,508

POWER TRANSMISSION GEARING

Filed Feb. 28, 1967   Sheet 1 of 4

JOSEPH A. POPE
WILLIAM LOWE
GEOFFREY ELLIS
INVENTOR:

BY
Bierman & Bierman
ATTORNEYS

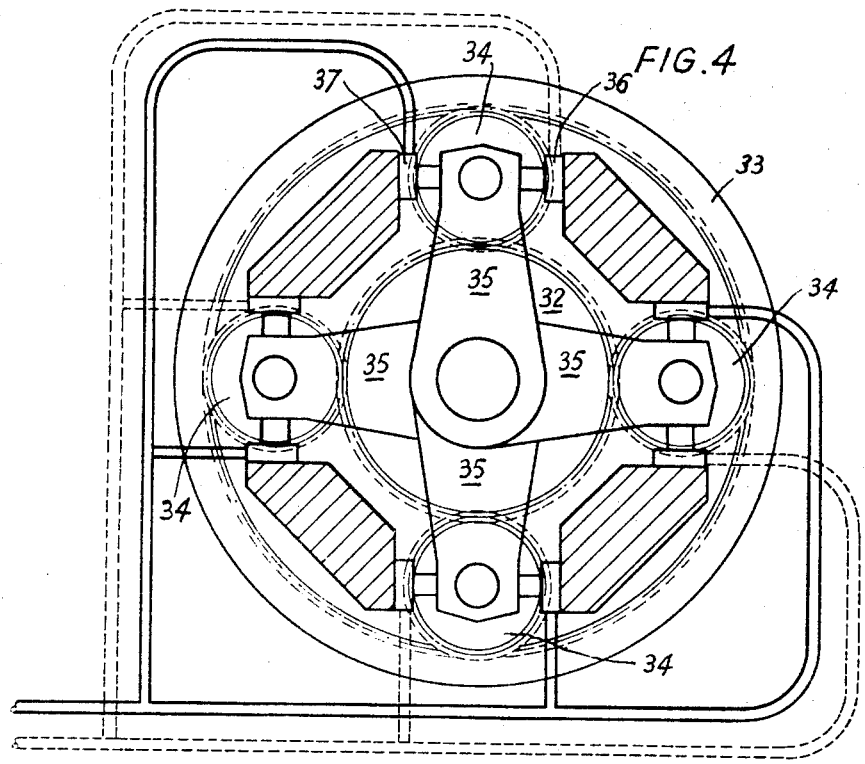

United States Patent Office 3,430,508
Patented Mar. 4, 1969

3,430,508
POWER TRANSMISSION GEARING
Joseph Albert Pope, Bramhall, William Lowe, Dukinfield, and Geoffrey Hender Stuart Ellis, Wilmslow, England, assignors to Mirrlees National Limited, a British corporation
Filed Feb. 28, 1967, Ser. No. 623,794
Claims priority, application Great Britain, Feb. 28, 1966, 7,466/67
U.S. Cl. 74—410          15 Claims
Int. Cl. F16h 57/08

ABSTRACT OF THE DISCLOSURE

Power transmission gearing comprising two coaxial common gear members coupled by other gear members to form a plurality of parallel gear trains wherein some of the other gear members are arranged in a coaxial group of at least two axially movable gear members and embodying helical gears whereby the working load creates opposed axially directed forces between the gear members of each group to provide a reaction force opposed to the original axially directed force.

---

This invention relates to power transmission gearing and in particular to heavy duty gearing (by which expression is meant power transmission of the order of 3,000 to 20,000 b.h.p. and over) of the kind hereinafter termed "the kind referred to" comprising two common gear members coupled by other gear members forming a plurality of parallel gear trains.

The expression "common gear member" is used to include not only a gear member of unitary construction but also an assembly of two or more gear members, as in the case of a double helical gear member.

An example of such gearing is an epicyclic gear of differential or like gear having a plurality of planetary pinions or layshafts respectively forming parallel gear trains coupling common sun and annulus gear members in an epicyclic gear or common input and output gear members in a differential or like layshaft gear.

A major problem in the design of such gearing is to obtain distribution of load as between the several parallel gear trains. This problem is, of course, more serious in the design of heavy duty gearing. In the design of gearing generally it is accepted that there is a practical limit to the axial length of gear pinions, due to the effect of torsional distortion under load since the torque is often applied to or taken from one end of the said common pinions, so that some means other than merely increasing the length of the pinions, has to be found to increase the load-carrying capacity of the gearing. One such other means is to incorporate a plurality of layshafts, or in the case of epicyclic gearing a plurality of planetary gears, so as to provide as aforesaid a plurality of parallel gear trains, but unfortunately it is well known that equality of load-distribution between the several parallel gear trains thus provided is in practice more theoretical than actual, so that the actual rating of such gearing designed with long toothed pinions or with a plurality of parallel gear trains is considerably lower than its theoretical rating should be, due to torsional distortion or inequality of load distribution aforesaid.

One object of the present invention is an improved construction of power transmission gearing of the kind referred to, with automatic load limitation or intertrain load distribution so as to enable larger power than hitherto possible to be handled in a single gear unit of a given size.

Another object of the invention is to enable, in effect, the length of the gear pinions to be extended while avoiding the practical length limit aforesaid so again as to increase the load-carrying capacity of a gear unit, while maintaining intertrain load distribution.

A still further object of the invention is to provide improved means for damping the effect of cyclic load variations, either input or output, applied to the transmission gearing, thereby to avoid resonance and like surge problems.

A multilayshaft gear unit is known embodying helical gearing on simple layshafts so arranged as to transmit the axial thrusts of the respective layshafts to a mechanical system of levers at one end of the gear thereby to obtain an equal thrust load on each layshaft and consequently, in theory, a truly equal distribution of the total transmission load amongst the several layshafts of the gear.

The present invention is based primarily on the appreciation that in the aforesaid known gearing the intertransmission of all load-sharing forces in gearing employing simple layshafts or non-grouped planetary pinions has been, and can only be, effected through, or by reaction from, the gear housing or some part external to the gear members themselves and upon the conception of a duplex or compound layshaft or several planetary pinions forming a gear group within which load-sharing forces may be contained.

According to the invention power transmission gearing comprising two common gear members coupled by other gear members forming a plurality of parallel gear trains is characterised in that some at least of said other gear members are arranged in a coaxial group of at least two gear members in number in such manner as to permit relative axial off-loading movement between the gears of said groups by reason of helical gear teeth and means resisting such relative axial movement by forces contained within the group.

The power transmission gearing aforesaid may be further characterised by means permitting relative off-loading movement between said other gears in a plurality of groups or between any such group and at least one other gear member not being part of a group but all forming parallel gear trains, in combination with means resisting such movement by forces not contained within a group.

The invention will be described by way of example with reference to the accompanying drawings.

In the accompanying drawings:

FIG. 4 is an end view of an epicyclic gear made in accordance with the present invention.

Figure 1:
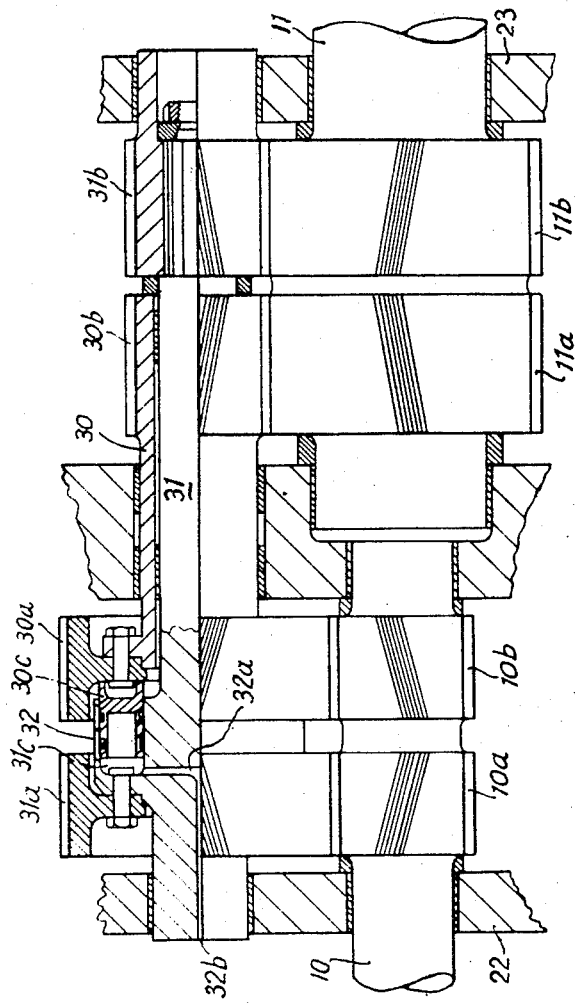
FIG. 1 is a longitudinal section of one example of a 4:1 reduction power transmission gear box made in accordance with the present invention.
Figure 2:
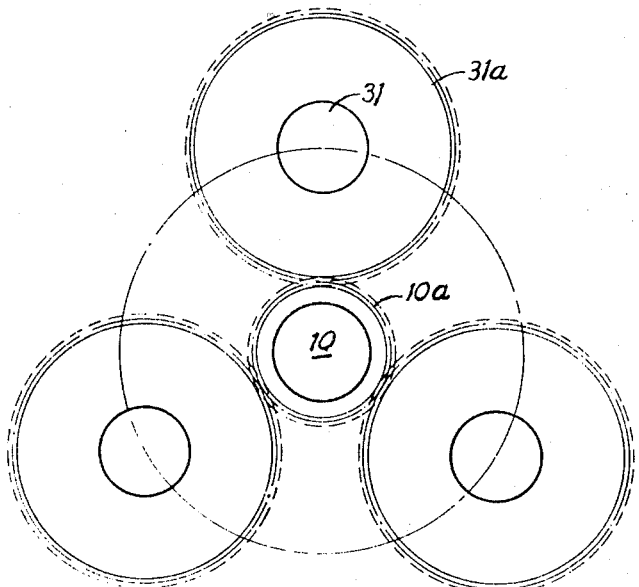
FIG. 2 is a diagrammatic end view from the left of FIG. 1.

As shown in FIGS. 1 and 2 of the drawings there are three layshafts, each of duplex construction, i.e., they consist of an outer shaft 30 carrying at its opposite ends helical pinions 30a and 30b of like but not necessarily equal angle of helix. An inner shaft 31, journalled therein for part rotation has helical end pinions 31a and 31b. The helix angle is equal and opposite to that of the pinions 30a and 30b and like each other but not necessarily of equal helix. The helices are preferably selected so that the axial thrust on shaft 30 will be equal and opposite to that on the shaft 31. A hydraulic ram system 32 fed by radial drilling 32a from an axial supply 32b is located between pinion wheels on the two shafts shown as an annular groove 31c on the left and an annular piston 30c on the right, both annular about the common axis of the shafts 30 and 31. FIG. 2 merely shows a symmetrical arrangement of three such duplex shafts meshing with double helical pinions 10a and 10b on an input shaft 10 and at their other ends meshing with double helical pinions 11a and 11b on the output shaft 11. If the power transmission gear is intended for reversible drive the hydraulic ram system will be duplicated at the other end.

With such arrangement, in operation axial thrusts generated in the layshafts of each pair will be self-cancelling on the input and output shafts, and will also share the load equally. Also the number of gearwheels and layshafts can be doubled and by a proportional increase in the overall length of the gear unit, the load capacity can be doubled without the problem of known torsional distortion inherent in longer pinions, since the individual pinions need not be longer than for a simple (non-duplex) layshaft.

Figure 3:
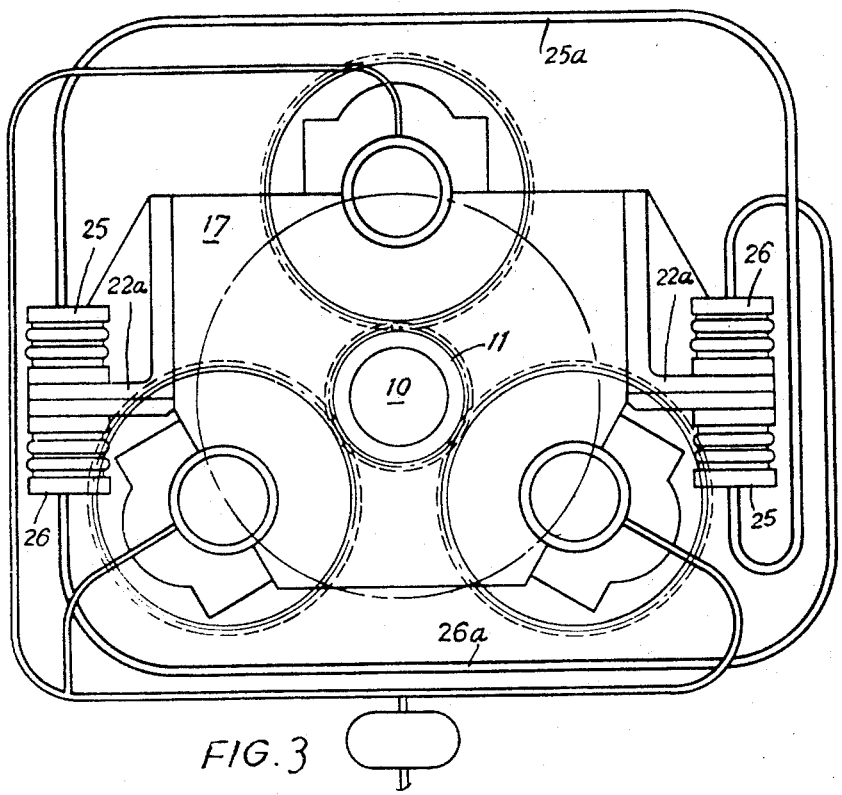
FIG. 3 is an end view showing a modification of the arrangement shown in FIGS. 1 and 2.

As shown in FIG. 3, in order to provide damping for shock or cyclic loads, the central bearing bracket 17 and the bearing plates, not shown, may be constructed for part rotational movement within a casing and opposed sets of air cushions, or air springs 25, 26 are provided, which may be coupled together by pneumatic lines 25a and 26a, complementary to lugs of which only 22a on the bracket 22 are shown in FIG. 3.

With such arrangement the centre framework 17 and the bearing plates are loaded against one of the pair of air-springs 25 or 26, which, in the manner of all air springs, damp out shock loads or cyclic loads which latter as is well known can cause so much serious damage by setting up resonance.

As shown in FIG. 4 there is an epicyclic gear with sun wheel 32, annulus 33 and four planet wheels 34. Each planet wheel is carried by an arm 35, independently movable about the axis of the sun wheel 32 against a pair of hydraulic jacks 36, 37.

In operation, preloading or a balanced sealed hydraulic system for the jacks will enable relative arcuate movement of the planets for distribution or equalisation of loading respectively as described for the arrangement of FIGS. 1 and 2. The hydraulic jacks are mounted on a common member, such as a planet cage. With such arrangement plain or paired helical gearing can be used, the arcuate movement, like the axial movement of the construction of FIGS. 1 and 2 taking place as a result of, and in proportion to, loading or relative loading until the limit determined by preloading, or equal load distribution, results.

As regards the helically cut gearwheels used for obtaining relative axial movement with resultant relative rotary movement in the coupling to the two common members on the input and output shafts necessary for off-loading and/or on-loading it follows that:

(a) if the helices are of the same hand at each end of a layshaft the helix angles must not be such that the unique condition of zero end thrust exists. The resultant axial thrust however in a gear having a ratio other than 1:1 will be the differential of the thrusts at the two ends and whatever may be the selected helix angles, i.e., whether the same at each end or different, these will balance out so that there will be equal and opposite displacement of the shafts as the working load varies;

(b) if the helices are of different hand at each end of a layshaft the resultant axial thrusts from the ends will be additive and the helix angles may be the same as each other, or different, the choice of angle enabling the resultant axial thrust to be within acceptable and useful proportions.

What is claimed is:

1. Power transmission gearing comprising two coaxial common gear members coupled by other gear members forming a plurality of parallel gear trains, characterized in that at least some of said other gear members are arranged in a coaxial group of at least two relatively axially movable gear members and embodying helical gears whereby a working load creates opposed axially directed forces between said relatively axially movable coaxial gear members of each group to provide a reaction force opposed to the said opposed axially directed forces.

2. Power transmission gearing according to claim 1 further characterized in that the means for providing the reaction force in a group is directly connected to the gear members of that group to retain said created axial forces within the group.

3. Power transmission gearing according to claim 1 further characterized by means coupling the means for providing the reaction forces of several groups.

4. Power transmission gearing according to claim 1 further characterized in that the said other gear members consist of at least one group of at least two coaxially arranged layshafts.

5. Power transmission gearing according to claim 1 further characterized in that the groups are mounted for separate relative arcuate movement, in combination with further reaction-producing means to oppose load generated forces tending to induce such separate relative arcuate movement.

6. Power transmission gearing according to claim 5 further characterized in that the reaction-producing means of several groups are coupled together.

7. Power transmission gearing according to claim 1 further characterized in that the reaction-producing means comprises hydraulic rams.

8. Power transmission gearing according to claim 1 further characterized by a frame carrying the said other gear members movable about the axis of the coaxial common gear members and shock and resonance damping means resisting such movement.

9. Power transmission gearing according to claim 8 further characterized in that the said shock and resonance damping means comprises fluid cushion means.

10. Power transmission gearing according to claim 1 wherein there are three of said coaxial groups, each group comprising two relatively axially movable members, said groups being disposed at substantially 120° intervals around the common gear members, said means to provide a reaction force consisting of a hydraulic ram system operating on hydraulic fluid, said system comprising an annular chamber between said axially movable gear members, an annular piston in said chamber, a source of hydraulic fluid connected to said chamber.

11. Power transmission gearing according to claim 10 wherein there is provided a central bearing bracket in which shafts of the common gear members and coaxial groups are journaled, said bracket being adapted for partial rotational movement within a casing, at least two opposed sets of fluid cushions mounted between said bracket and said casing, each of said sets having an upper side and a lower side, each of said sides of the sets being mounted between said bracket and said casing, fluid connections between said upper side of one cushion to said lower side of the other cushion and between said lower side of said one cushion to said upper side of said other cushion, whereby cyclic and shock leads are dampened.

12. Power transmission gearing comprising common sun and annulus members, a plurality of planetary members forming parallel gear trains between the sun and annulus members, arms carrying said planetary members movable about the common axis of the said annulus and planetary members and means to provide reaction forces to oppose such movement.

13. Power transmission gearing according to claim 12 further characterized in that the means providing the reaction forces comprise hydraulic rams.

14. Power transmission gearing according to claim 13 further characterized in that the several hydraulic rams are inter-coupled to a common source of hydraulic pressure.

15. A power transmission gearing system comprising a sun and annulus members having a common axis, a plurality of planetary members forming parallel gear trains between said sun and said annulus members, arms carrying said planetary members movable about said common axis, and means for providing reaction forces to oppose such movement comprising a pair of hydraulic jacks on each planet wheel with said annulus, each said pair of jacks mounted between a planet cage and one of said arms, said pair comprising a first jack on one side of said arm and a second jack on the other side of said arm, each of said first jacks and each of said second jacks being in fluid connection with the remaining first jacks and second jacks respectively, whereby the load on said system will tend to be equalized.

References Cited

UNITED STATES PATENTS

| | | | |
|---|---|---|---|
| 1,847,611 | 3/1932 | Hodgkinson | 74—410 |
| 2,386,367 | 10/1945 | Taylor | 74—410 |
| 2,496,857 | 2/1950 | Cronstedt et al. | 74—410 |
| 2,518,708 | 8/1950 | Moore | 74—410 |
| 2,899,822 | 8/1959 | Matthews | 74—410 X |

FOREIGN PATENTS

| | | |
|---|---|---|
| 814,905 | 6/1959 | Great Britain. |
| 943,383 | 12/1963 | Great Britain. |

DONLEY J. STOCKING, *Primary Examiner.*

L. H. GERIN, *Assistant Examiner.*